United States Patent Office 3,836,531
Patented Sept. 17, 1974

3,836,531
SYNTHETIC NACREOUS PIGMENTS AND
METHOD FOR PRODUCTION THEREOF
Nobumitsu Yano, Iruma-gun, Oi-machi, Masao Fukushima and Itaru Fukinbara, Tokyo, Masanori Kishi, Omiya-shi, and Kazuyoshi Kimura, Yamoto-machi, Japan, assignors to Asahi Kasei Kogyo Kabushiki Kaisha, Osaka, Japan
No Drawing. Filed Dec. 11, 1969, Ser. No. 884,338
Int. Cl. C07d 55/24, 55/36
U.S. Cl. 260—248 A
11 Claims

ABSTRACT OF THE DISCLOSURE

A synthetic nacreous pigment particle consisting of thin plate-shaped crystals of at least one compound selected from the group consisting of triazine derivatives thereof; and a decorative synthetic nacreous pigment containing the said pigment particles. In the production of the aforesaid pigment particle, crystals having smooth surfaces, uniform shapes and crystal sizes can be obtained by effecting the crystallization thereof in the presence of at least one surface active agent. Particularly, said synthetic nacreous pigment particles consisting of crystals having a length of 3–100 microns, a width of 1–40 microns and a thickness of 0.05–3 microns can impart elegant and refined luster to cosmetics, synthetic resin tablewares natural and synthetic fibers, natural and synthetic leathers, paper and glass, when applied thereto.

---

This invention relates to a method for producing thin plate-shaped crystals of at least one compound selected from the group consisting of triazine and triazine derivatives, said crystals having pearl luster, which comprises crystallizing the said compound from a solution thereof in the presence of a surface active agent, and also relates to synthetic nacreous pigment particles composed of the resulting thin plate-shaped crystals, and further to synthetic nacreous pigments for decoration containing the said pigment particles.

Pigments having pearl luster have long been studied, and as synthetic nacreous pigments, there have been known, for example, those made from fish platelets of herring, sprat, pilchard, etc. and also inorganic compounds such as lead carbonate, bismuth chloride, lead phosphate, etc. However, the fish platelets are not only expensive but also contain inherently a large amount of impurities. They have therefore such drawbacks that when they are used as pearl essences, the impurities adversely affect the product containing the fish platelets during storage to yellow or redden the product. Further, if the purification of the fish platelets is not sufficient, an offensive odor becomes emitted. Accordingly, such fish platelets are, after all, not suitable as raw materials for the modern industries where a mass production of standardized products is always required.

In the light of the above fact, extensive research has heretofore been done to obtain pigments having good pearl luster, but free from the drawbacks that the fish platelets have. However, the aforesaid lead carbonate, bismuth chloride, lead phosphate, etc. have strong toxicity and low resistance to chemicals, and hence are not suitable for decorating cosmetics, synthetic resins for toys, containers for foods and beverages, and the like.

Taking the foregoing points into consideration, the present inventors have done extensive research on inexpensive organic compounds having pearl luster to find that triazine and derivatives thereof satisfy the conditions for developing pearl luster.

An object of the present invention is to provide a synthetic nacreous pigment which is quite harmless to the human bodies and has excellent pearl luster.

Another object of the present invention is to provide a novel synthetic nacreous pigment particle, and a new method for producing the same, which consists of plate-shaped crystals of at least one compound selected from the group consisting of triazine derivatives thereof.

A further object of the present invention is to provide a novel method for endowing pearl luster to various materials.

Further objects and the effect of the present invention will be clear from the following description.

Commercially available triazine or triazine derivatives, for example, 2,4,6-triamine-s-triazine (melamine monomer), is dissolved in hot water, and the resulting solution with or without addition thereto of a surface active agent is cooled relatively quickly with stirring, or poured into cold water, whereby thin plate-shaped crystals of the said compound are deposited. In that case, thin plate-shaped crystals having a relatively uniform shape may be obtained by cooling the solution relatively slowly till the initiation of the crystallization, and rapidly cooling the solution with stirring as soon as the crystallization is initiated, thereby quickly depositing crystals, though the shape and size of crystals can vary depending on the method of crystallization. The thus obtained crystals as such can, in some cases, be added to an aqueous face lotion, or can also be blended with soap or milky lotion. In general, however, these crystals are dispersed in n-hexane, butyl alcohol or the like which is used as dispersing medium for ordinary pigments, and, if necessary, may be blended with other additives, for example, nitrocellulose and the like, whereby a pigment having elegant pearl luster can be obtained. Cosmetics such as lipstick, manicure liquor, etc., tablewares made of various synthetic resins such as polystyrene, methacrylate resin, etc., cotton, various chemical fibers and synthetic fibers, natural and synthetic leathers, paper, glass and the like, which have incorporated thereinto or coated thereon the above-mentioned pigments of triazine derivatives having pearl luster, have elegant and refined pearl luster. The above-mentioned pigments are highly resistant to heat and chemicals and also show good weatherability even after they have been incorporated into or coated onto various materials.

The term "triazine derivatives" used herein includes any compounds represented by the following general formulae (I) and (II), which contain s-triazine ring and as-triazine ring:

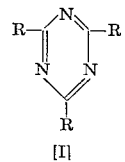  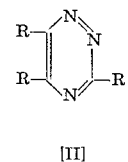

[I]                [II]

wherein R represents a hydroxy, amino, methyl or phenyl group. From the above mentioned compounds can be obtained a desired product having pearl luster by selecting suitable crystallization conditions.

The above-defined triazine derivatives can easily be obtained by ordinary s-triazine ring and astriazine ring-formation reactions. For example, 2,4,6-triamino-s-triazine can be obtained by heating dicyanodiamide in liquid ammonia and 2,4,6-trihydroxy-s-triazine can be obtained by polymerizing cyanic acid. Further, 3-amino-5,6-dimethyl-as-triazine can easily be obtained by the reaction of diacetyl and aminoguanidine. Moreover, 2,4,6-triamino-s-triazine is commercially available as a starting monomer for melamine resins, which has already been produced on an industrial scale.

As the thin plate-shaped crystals of triazine and triazine derivatives of the present invention, which can develop pearl luster, there are usually suitable those having a length of 3 to 100 microns, a width of 3 to 40 microns and a thickness of 0.05 to 3 microns. In this case, the most important matter is that the crystals are uniform in shape and size, and have smooth crystal surfaces. Commercially available triazine derivatives are in the form of a powder or a column, and therefore, they do not have such pearl luster, and even when they are recrystallized under conventional crystallization conditions, they do not form crystals having pearl luster. For that reason, no one has ever been able to utilize triazine and triazine derivatives as the bases of synthetic nacreous pigments in spite of their high reflective indexes.

As a result of studies in detail on the crystallization conditions for triazine derivatives, the present inventors have succeeded in obtaining the crystals capable of satisfying all of the above-mentioned requirements by controlling the difference in temperature in crystallization and the pH and simultaneously adding a surface active agent to the crystallization system.

The crystallization conditions may be varied depending upon the kind of compound used and the form, size and thickness of the desired crystal. Further, the shape of crystals is determined by a suitable combination of a temperature difference, a cooling speed, a pH-change rate and a kind, amount and addition time of surface active agent. Though these conditions are specifically set forth in the Examples which will be shown hereinafter, the relation between the crystallization conditions and the shape of crystals is explained by referring to the following example:

When 2,4,6-triamino-s-triazine is crystallized from an aqueous solution thereof containing an anionic surface active agent, Lunox 100, the form and thickness of crystal precipitated greatly varies depending upon speed for cooling the solution. That is, when the solution is cooled with stirring from 50° C. to 30° C. in 60 min., there are obtained rectangular crystals having a length of 20 microns, a width of 10 microns and a thickness of 0.07 micron. When the solution is cooled with stirring from 50° C. to 30° C. in 40 min., rectangular crystals are obtained which have a length of 15–20 microns, a width of 3–5 microns and a thickness of 0.08 micron. When cooling is effected in 10 min., small crystals having a length of 5 microns, a width of 2 microns and a thickness of 0.2 micron are precipitated. Thus, the higher the cooling speed, the larger and thicker the crystals formed, and the gloss of the crystals becomes weak. On the other hand, when the cooling from 50° C. to 30° C. is effected in 180 min. or more, the crystals obtained are cylindrical, and no thin-plate-shaped crystals are obtained.

Further, the difference in pH of the solution after the addition of a surface active agent and before the first deposition of microcrystals results in a difference in the form and thickness of crystals formed. That is, when the solution is maintained at a pH of 6.8 to 7.2, the precipitated crystals are of a rectangle having a thickness of 0.07 micron. At a pH of 5 to 6, there are obtained crystals of a diamond or triangle having a thickness of 0.1 micron, and at a pH of 7.5 to 8.5, rectangular crystals having a length of 20 microns, a width of 3 microns and a thickness of 0.1 micron are obtained. The crystallization while maintaining the solution neutral results in a streamline pattern having the strongest pearl gloss in the solution.

Lunox 100 is the most suitable surface active agent to obtain thin-plate-shaped crystals of 2,4,6-triamino-s-triazine. The amount of said surfactant added affects the thickness of the crystals precipitated. That is, in an amount of 0.5 to 1.0% by weight, there are obtained crystals having a thickness of 0.07 micron, and outside the said amount range, somewhat thicker crystals are obtained.

The mechanism of the effect of a surface active agent added in the present invention has not been clarified, but it is considered that the said surface active agent affects or causes some change in the state of the solution, such as physical properties, density balance, diffusion, etc. to maintain the crystallization system under certain favorable conditions for the formation of crystal nuclei and the growth of thin plate-shaped microcrystals. For example, when 1 g. of pure 2,4,6,-triamino-s-triazine is dissolved in 100 ml. of hot water kept at 90° C., and the resulting solution is cooled relatively quickly to 10° C. with stirring, whereby merely a part of the deposited crystals forms thin plate-shaped crystals, and only a few streamline patterns are observed in the solution. It is considerably difficult to isolate from this crystallization solution only thin plate-shaped crystals, and at the same time, the thin plate-shaped crystals thus obtained are not uniform in shape and dimensions. On the other hand, 1 g. of 2,4,6-triamino-s-triazine having a relatively high purity, for example, a purity of 95%, is dissolved in hot water kept at 90° C., and, after lowering the solution temperature to 50° C., 0.5 g. of an anionic surface active agent, Lunox–100 (a trade name) is added thereto and the solution is slowly cooled while suitably controlling the solution temperature, whereby 0.45 g. of thin plate-shaped crystals each having a uniform rectangular form of a length of 15 to 20 microns, a width of 3 to 5 microns and a thickness of 0.08 micron, were deposited. When the same operation as above is repeated without using the surface active agent, almost all of the crystals obtained are column-shaped crystals.

Thus, the surface active agent used in the present invention serves not only to suitably adjust the thickness of crystals, thereby controlling the growth direction of crystals so as to form thin plate-shaped crystals but also to make the shape and size uniform and simultaneously to eliminate the adverse effects of associated impurities, which prevent the crystallization.

The surface active agents used in the present invention include, for example, cationic surface active agents such as amines and salts thereof, quaternary ammonium salts, pyridinium salts, picolinium salts, zelanium salts, belanium salts, amine-formaldehyde condensation products and stearon chromic chloride; anionic surface active agents such as alkyl sulfates, alkylbenzene sulfonates, alkylnaphthalene sulfonates, naphthalene sulfonate-formaldehyde condensation products, alkyl phosphates, amidosulfonate and sulfo-succinate dialkyl esters; amphoionic surface active agents such as betaine type (for example, alkyl betaines), sulfoxylate type (for example, hydroxyethylimidazoline sulfonate), sulfonate type and phosphate type; and nonionic surface active agents such as ester-type, ether-type, alkylphenol type, span-type and tween-type.

The appropriate amount of the surface active agent used in the present crystallization may vary depending on the kind of surface active agent employed and the kind of triazine and derivatives thereof employed. In general, however, the amount thereof is suitable 1 to 0.001% by weight based on the weight of the mixed solution. The surface active agent may be added to the liquid at the beginning, or may be added either immediately before or after the initiation of the separation of the desired crystals. In any case, it is sufficient for the surface active agent to be dissolved or dispersed in the liquid during the crystallization.

The crystallization concentration of triazine and derivatives thereof may, of course, vary depending on the kind thereof. The crystallization concentration, however, is preferably 0.1 to 2%, though these compounds have different solubilities.

The thus deposited thin plate-shaped crystals are isolated by an appropriate method, for example, filtration, centrifugation or the like. When the crystals thus isolated as such are blended with an aqueous or alcoholic face lotion, soap or milk lotion, commercially valuable articles having a streamline pattern and elegant pearl luster can be obtained. Furthermore, these crystals may be dispersing medium for pigment, such as acetone, n-hexane, butyl alcohol or the like and the resulting dispersion may be kneaded into or coated onto the objective material together with necessary additives and sizes and then dried.

The amount of triazine derivatives added varies depending on the kind, uses and quality of the desired product, and the pearl luster is more intensified with an increase in said amount. However, 0.01 to 0.5% by weight of said compounds is suitable in view of such commercial values as economics and liking. Further, said compounds may be used in combination with conventional materials having pearl luster, for example, lead carbonate, fish platelets and the like. Alternatively, it may be possible to use a mixture of thin plate-shaped crystals of two or more compounds selected from the group consisting of triazine derivatives. The use of said compounds in combination with other materials as mentioned above is preferable, in some cases, because this is effective in enhancing the characteristics of pigment and in curtailing the costs of pigment stock.

The method of adding the crystals of triazine derivatives varies depending upon the use of an article to which the crystals are added. For example, in the case of cosmetics, such as lipstick or manicure liquor, the crystals are required to be uniformly dispersed therein, and hence, it is necessary to add the crystals at the time of kneading base materials, that is, before the base materials solidify so that the crystals can uniformly be dispersed in the product. In the case where the crystals are applied to synthetic resin products, for example, tablewares or decorative laminates, it is sometimes preferable to mix them with base materials to be molded before the molding is carried out. In some cases, the crystals may be incorporated on the way of molding to uniformly dispersed them in the product. In the case where it is intended to impart an ornamentality to paper, leather or glass plates, it is sometimes sufficient to suspend the crystals in a solvent together with a suitable size, and to spray the resulting mixture onto the surface of the objective article and dry the treated surface. Further, it is also possible to enhance the decorative function of coating materials such as paints, lacquers, enamels, etc. by mixing the crystals with said coating materials. Furthermore, it is also possible to enhance the ornamentality of paper, textile fabrics or leather by mixing the crystals with dyes or coloring matters.

As mentioned hereinbefore, the present invention provides a method of utilizing thin plate-shaped crystals of triazine derivative as a pigment particle capable of imparting pearl luster and a composition containing the crystals. Further, the present invention provides a process for forming crystals of triazine derivatives, each crystal having substantially same length, width and thickness and having smooth surfaces and uniform shapes in good yield by adding a surface active agent to a solution of triazine derivatives.

The advantages of the present invention may be summarized as follows:

(1) Inexpensive compounds may be used as the raw materials.

(2) The present synthetic nacreous pigments are chemically stable and highly weather-resistant.

(3) The present thin plate-shaped crystals are close in specific gravity to those of conventional pigment compositions, as compared with inorganic foils such as those of lead carbonate, lead arsenate, etc., and therefore, the present crystals can easily be uniformly dispersed.

(4) The present crystals can alway be obtained with ease in uniform shape and size, as compared with fish platelets, and consequently, the mass production thereof is possible.

(5) The present crystals may be used in combination with other pigments having pearl luster.

(6) Thin plate-shaped crystals having definite dimensions, uniform shape and smooth crystal surfaces can freely be obtained by use of a surface active agent, and control of the crystallization is easy since the thickness, shape and size of the present crystals can freely be changed as desired, in comparison with naturally occurring products, such as fish platelets, and further no chemical reaction is caused during crystallization as compared with inorganic synthetic foils such as lead carbonate and the like.

The present invention is further explained with reference to the following Examples, which are merely by way of illustration and not by way of limitation. In these Examples, all parts and percentages are by weight unless otherwise specified.

Example 1

Fifteen parts of a saturated polyester resin (acid component:adipic acid) of a low viscosity containing 5% of sorbitane monooleate which is a lipophilic non-ionic surface active agent was added to 100 parts of an aqueous paste of 2,4,6-triamino-s-triazine having a 55% thin plate-shaped crystal concentration, and the resulting mixture was stirred. The water liberated was removed by decantation, whereby a paste containing 10% of water was obtained. The paste thus obtained was dried under reduced pressure at 55° C. for 3 hrs., and 3 parts of the thus obtained dehydrated paste having a 42.6% crystal concentration was dispersed in 7 parts of nitrobenzene, an organic solvent, and to the resulting dispersion was added 1 part of 100% water-soluble phenol resin. The resulting mixture was well mixed. The thus obtained pigment was coated onto a glass plate and slowly dried. The evaporation of the solvent was completed in about 30 hrs., at which a film having good pearl luster was obtained.

Example 2

Two hundred parts of an aqueous paste of 2,4,6-triamino-s-triazine having a 50% thin plate-shaped crystal concentration was flashed with 25 parts of a castor oil-modified alkyd resin to prepare a dehydrated paste. 5 Parts of the dehydrated paste was well mixed with 15 parts of nitrocellulose, and to the resulting mixture were added 7.5 parts of Santolite, 3.8 parts of dibutyl phthalate, 25.3 parts of butyl acetate, 6.4 parts of ethanol 1.1 parts of butanol, 32.9 parts of toluol and 3.0 parts of a coloring matter. The resultant mixture was well mixed, whereby a manicure liquor having good pearl luster was obtained.

Example 3

With the following prescription, a lip-stick was prepared according to a usual method, which was found to have good pearl luster:

|  | Parts |
|---|---|
| Bees wax | 10 |
| Lanoline | 5 |
| Carnauba wax | 4 |
| Bromic acid | 2 |
| Cetanol | 5 |
| Castor oil | 39 |
| Ceresine | 40 |
| Crystalline 2,4,6-triamino-s-triazine paste | 20 |
| Pigment (Commercially available) | 10 |
| Cosmetic flavor | 1 |

Example 4

To 2.5 kg. of a liquid, unsaturated thermosetting polyester resin were added 20 g. of fish platelet-like crystals of 2,4,6-triamino-s-triazine and 5 g. of guanine crystals having pearl luster, and 25 g. of a curing accelerator was added to the mixture and sufficiently mixed with the resin. Thereafter, 25 g. of a 60% methylethylketone peroxide solution was added to the mixture and stirred. The mixture was then immediately poured into a drum type centrifuge injection machine having a diameter of 55 cm. and a length of 50 cm., and shaping was effected at a drum temperature of 35°–36° C. and at drum revolutions of 100 r.p.m. After about 30 min. from the initiation of shaping, semi-cured sheet-form polyester resin was taken out of the drum, and immersed in hot water to effect complete curing, whereby a polyester sheet having pearl luster was obtained. Comparing the thus obtained sheet with a conventional pearl luster sheet comprising a basic lead carbonate as the principal ingredient, the conventional sheet was degraded in its pearl luster when subjected to hot water-curing, whereas no such degradation was observed at all in the case of the sheet prepared according to the present invention.

Example 5

To a face cream composed of 33 parts of soybean oil, 10 parts of colophony, 8.5 parts of potassium hydroxide, 20 parts of glycerine, 70 parts of water and 0.1 part of p-oxybenzoic acid ethyl ester was added 10 parts of water containing 5% of fish platelet-like crystals of 2,4,6-triamino-s-triazine, and the resulting mixture was thoroughly blended, whereby an elegant face cream having pearl luster was obtained.

Example 6

Six parts of sarol, 1 part of tannic acid, 5 parts of castor oil, 83 parts of 94% alcohol, 5 parts of water containing 10% of fish platelet-like crystals of 2,4,6-triamino-s-triazine, and several drops of a cosmetic flavor were blended in a conventional manner to prepare a lotion, which had pearl luster and showed an excellent liquidity.

Example 7

One hundred parts of an aqueous 6-amino-S-triazine-2,4-diol paste having a 50% fish platelet-like crystal concentration was charged with 15 parts of a saturated polyester resin of a low viscosity containing 5% of sorbitane monooleate, a lipophilic non-ionic surface active agent, and stirred. The water liberated was removed by decantation therefrom, whereby a paste containing 10% of water was obtained. The paste was dried under reduced pressure at 55° C. for 3 hours, and 3 parts of the thus obtained dehydrate paste was dispersed in 7 parts of nitrobenzene, and further one part of 100% water-soluble phenol resin was added thereto and thoroughly mixed. The thus obtained pigment was coated onto a glass plate and slowly dried. The completion of the evaporation of solvent was in about 30 hrs., a film having good pearl luster was obtained.

Example 8

Five parts of the dehydrated paste of 6-amino-s-triazine-2,4-diol obtained in Example 7 was mixed with 15 parts of nitrocellulose with thorough stirring. To the resulting mixture were added 7.5 parts of Santolite, 3.8 parts of dibutyl phthalate, 25.3 parts of butyl acetate, 2.9 parts of toluene and 3 parts of a coloring matter, and thoroughly mixed, whereby a manicure liquor having good pearl luster was obtained.

Example 9

Using 20 parts of platelet-like crystals of 2,4,6-trihydroxy-s-triazine, a lipstick was prepared by a usual procedure according to the following prescription.

| | Parts |
|---|---|
| Bees wax | 10 |
| Lanoline | 5 |
| Carnauba wax | 4 |
| Bromic acid | 2 |
| Cetanol | 5 |
| Castor oil | 39 |
| Ceresine | 4 |
| Pigment, commercial available | 10 |
| Cosmetic flavor | 1 |

The thus obtained lipstick had good pearl luster.

Example 10

A face lotion having an elegant streamline pattern was prepared by a usual method according to the following prescription:

| | Parts |
|---|---|
| 2-hydroxy-4,6-diamino - s - triazine fish-platelet-like crystal | 0.5 |
| Triethanolamine | 0.5 |
| Glycerine | 4 |
| Alcohol | 3 |
| Water | 64.5 |
| Pigment | 0.5 |
| Cosmetic flavor | 0.5 |

Example 11

In 2.5 kg. of a liquid, unsaturated thermosetting polyester resin were dispersed 20 g. of fish platelet-like crystals of 4-amino-6-phenyl-s-triazine-2-ol, 5 g. of guanine crystals having pearl luster, and 25 g. of a curing accelerator was added to the mixture and sufficiently dissolved in the resin. Thereafter, 25 g. of a 60% methylethylketone peroxide solution was added to the mixture and stirred. Subsequently, the mixture was poured into a drum type centrifuge injection machine having a diameter of 55 cm. and a length of 50 cm., and shaping was effected at a drum temperature of 35° C. and at drum revolutions of 100 r.p.m. after about 30 min. from the initiation of shaping, a semicured and sheet-shaped polyester resin was taken out of the drum and immersed in hot water to complete curing thereof. There was obtained a polyester sheet having pearl luster.

Example 12

A liquid prepared by dispersing with stirring 0.5 g. of fish platelet-like crystals of 3-amino-5,6-dimethyl-as-triazine in 30 g. of a 7.02% solution of poly-$\gamma$-methyl-L-glutamate in dichloroacetic acid was diluted with 200 parts of methylene chloride. To the diluted liquid was added 20 g. of poly-$\gamma$-methyl-L-glutamate fibers (120% stretched filament) in the form of 25 mm. pieces, and the fibers were homogeneously dispersed with stirring in the liquid. Thereafter, the mixture was poured onto a flat metal plate and air-dried at 20° C. The solvent was then completely removed by blowing hot air of 60° C. thereover, whereby an unwoven fabric-like material was obtained, in which the poly-$\gamma$-methyl-L-glutamate fibers were mutually adhered through the poly-$\gamma$-methyl-L-glutamate. Said material had good pearly luster.

Example 13

Ten grammes of white powders of 2,4,6-triamino-s-triazine having a purity of 95.5% was dissolved while being heated in 1 l. of distilled water. The temperature of the resulting solution was lowered, while stirring the solution, to 50° C., and at this point, 0.5 g. of an anionic surface active agent, Lunox 100 (a trade name), was added thereto. Thereafter, the temperature of the solution was slowly lowered to 30° C. in about one hour, whereby thin plate-shaped microcrystals having a length of less than one micron began to separate. At this time, the stirring velocity was extremely lowered and the temperature of the liquid was slowly lowered to 10° C., whereby crystals having pearl luster, smooth surfaces, a length of about 20 microns, a width of about 10 microns and a thickness of about 0.07 micron began to separate. In that state, the reaction was continued for one hour, whereby all the deposited crystals had uniformly the above sizes, and the reaction liquid showed a strong streamline pattern. The crystals were collected from this reaction liquid by filtration and dried. The dried crystals as such were well blended with resins, and the resulting blend was subjected to compression molding or injection molding to obtain a synthetic resin molded article having pearl luster.

Example 14

A solution was prepared by heating and dissolving 10 g. of white powders of 6-amino-s-triazine-2,4-diol having a purity of 97.5% in 1 l. of distilled water, said solution being referred to hereinafter as "Solution A." Separately, a liquid was prepared by adding 0.5 g. of a cationic surface active agent, Anstex 0-200 (a trade name) to 4 l. of distilled water, said liquid being referred to hereinafter as "Liquid B." Solution A was poured at once in Liquid B while being stirred, and the reaction mixture was slowly cooled to 20° C. in about one hour, whereby microcrystals having a size of about one micron began to separate. In that state, the reaction was continued for 2 hours, whereby the reaction mixture showed a strong streamline pattern. At that time, the crystals deposited were thin diamond-shaped plate crystals having a diameter of about 15 microns and a width of about 0.08 micron. The thus formed crystals were separated by filtration, subjected in a wet state to flashing operation to remove the reaction solution present on the surfaces of crystals, and washed with methanol. Thereafter, the thus obtained crystals were formulated with various base materials according to various uses to obtain excellent pigments for imparting pearl luster.

Example 15

Ten grammes of white powders of 2,4,6-trihydroxy-s-triazine having a purity of 95.0% was heated and dissolved in 1 l. of distilled water, and the temperature of the resulting solution was lowered to 50° C. At this point, 0.5 g. of an amphoionic surface active agent, Obanol D (a trade name) was added to the solution, and the temperature of the reaction liquid was lowered to 20° C. in about one hour. In that state, the reaction was continued for 2 hours, whereby herrings scale-like crystals having pearl luster, a length of 15-20 microns, a width of 3-5 microns and a thickness of 0.08 micron were deposited. The crystals were collected by filtration and then completely dehydrated by subjecting them to flashing operation to obtain thin plate-shaped crystals of 2,4,6-trihydroxy-s-triazine. Two parts of the thus obtained crystals were blended with 15 parts of bees wax, 10 parts of the thus obtained crystals were blended with 15 parts of bees wax, 10 parts of lanoline, 4 parts of castor oil, 4 parts of ceresine and 1 part of cosmetic flavor to prepare a lipstick. The thus obtained lipstick had good pearl luster.

Example 16

Ten grammes of white powders of 2,4-diamino-6-phenyl-s-triazine having a purity of 95.5% was heated and dissolved in 1 l. of 0.1 N aqueous ammonia. The resulting solution was stirred in a boiling water bath while purging off the ammonia present in said solution, whereby thin plate-shaped microcrystals having a size of less than one micron were deposited. This solution was filtered, and the filtrate was charged with 15 ml. of a 1% aqueous solution of a non-ionic surface active agent, Nonal 210 (a trade name) and the resulting mixture was allowed to stand in a cold room at 5° C. After about 10 hours, there were deposited crystals having a length of 10 microns, a width of 5-10 microns and a thickness of 0.07 micron. The crystals were collected by filtration and completely dehydrated by subjecting them to flashing operation to obtain thin plate-shaped crystals of 2,4-diamino-6-phenyl-s-triazine. Two parts of the thus obtained crystals were blended with 100 parts of a polyvinyl chloride resin, 48 parts of dioctyl phthalate, 0.7 part of cadmium stearate and 0.5 part of barium stearate. The resulting mixture was kneaded on an open roll at 170° C., and the kneaded product was subjected to sheeting on a calender roll to prepare a pearl sheet.

Example 17

One liter of a 0.5% suspension of 4-amino-6-phenyl-s-triazine-2-ol having a purity of 96.5% was placed in a boiling water bath to form a solution. Ethanol was added dropwise to the solution at a rate of 10 ml./min., whereby needle crystals having a size of less than 3 microns were deposited. The solution was filtered, and the filtrate was charged with 1 ml. of a 1% solution of an anionic surface active agent, Gafac RS-410 (a trade name), and the reaction mixture was rapidly cooled to 5° C. in 5-10 minutes with stirring, and thereafter the reaction mixture was maintained at 5° C. for about one hour, where a streamline pattern was observed. At that time, the deposited crystals had a length of 25-30 microns, a width of 5-6 microns and a thickness of 0.08 micron. Microscopic comparison of said crystals with herring's scales showed that the crystals were very similar in shape to the herring's scales, and that herring's scales were uneven in their superficial dimensions, whereas those of the crystals were substantially regular.

The above crystals were collected by filtration, washed with ethanol and air-dried, and then formed into a paste using a dispersing agent, resins and the like. The paste was diluted with an appropriate diluent to obtain a pearl luster paint.

Example 18

Five grammes of white powders of 3-amino-5,6-dimethyl-s-triazine having a purity of 97.5% was dissolved in 1 l. of distilled water. After completion of dissolution, the temperature of the resulting solution was lowered to 50° C., and thereto were added dropwise with stirring methanol at a rate of 10 ml. per minute and a 1% solution of a cationic surface active agent, Anstex C-200 (a trade name) at a rate of 5 ml. per minute, whereby microcrystals began to deposit. At this point, the stirring and, the additions of methanol and the surface active agent, were discontinued, and the reaction mixture was slowly cooled to 5° C. in about one hour, whereby crystals having a diamond shape to a square and, a diameter of about 10 microns and a thickness of about 0.1 micron were deposited. The crystals were collected by filtration, washed with methanol and air-dried. The crystal thus obtained were again suspended and stirred in ethanol, whereby a streamline pattern having excellent pearl luster was observed, which proved that the crystals can be used as a pearl pigment as desired.

What is claimed is:

1. A synthetic nacreous pigment particle consisting essentially of thin plate-shaped crystals of at least one compound selected from the group consisting of s-triazine derivatives and as-triazine derivatives represented by the formulas:

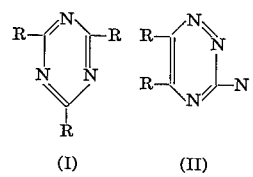

(I)    (II)

wherein R is a hydroxy, amino, methyl or phenyl group.

2. A pigment particle according to claim 1 which is a particle of a triazine compound selected from the group consisting of 2,4,6-triamino-s-triazine, 2,4,6 - trihydroxy-s-triazine, 6 - amino-s-triazine-2,4-diol, 2-hydroxy-4,6-diamino-s-triazine, 4 - amino - 6-phenyl-s-triazine-2-ol, 3-amino - 5,6 - dimethyl-as-triazine, 2,4-diamino-6-phenyl-s-triazine.

3. A pigment particle according to claim 2 wherein the triazine compound is limited to one having 1 to 3 amino groups.

4. A synthetic nacreous pigment particle which consists of thin plate-shaped crystals having a length of 3 to 100 microns, a width of 1 to 40 microns, and a thickness of 0.05 to 3 microns, said crystals being of the triazine derivatives of Claim 1.

5. A synthetic nacreous pigment particle according to Claim 4, wherein the compound is 2,4,6-triamino-s-triazine.

6. A synthetic nacreous pigment particle according to Claim 4, wherein the compound is 2,4,6-trihydroxy-s-triazine.

7. A process for preparing thin plate-shaped crystals of a compound selected from the group consisting of triazine derivatives of Claim 1, the crystals having smooth surface and a uniform shape and size, which comprises effecting the crystallization in the presence of a surface active agent.

8. A process according to Claim 7, wherein the compound is 2,4,6-triamino-s-triazine.

9. A process according to Claim 7, wherein the compound is 2,4,6-trihydroxy-s-triazine.

10. A process according to Claim 7, wherein the crystals have a length of 3 to 100 microns, a width of 1 to 40 microns, and a thickness of 0.05 to 3 microns.

11. A process according to Claim 7, wherein the amount of the surface active agent is 0.001 percent to 1 percent by weight based on the weight of reaction liquid.

References Cited

UNITED STATES PATENTS

| | | | |
|---|---|---|---|
| 2,918,467 | 12/1959 | Hibbitts et al. | 260—249.7 |
| 2,776,285 | 1/1957 | Dyer | 260—249.7 |
| 2,302,162 | 11/1942 | Zerweck et al. | 260—249.9 |
| 3,681,374 | 8/1972 | Yano et al. | 260—308 R |
| 1,989,042 | 1/1935 | Kunz et al. | 260—248 X |
| 2,197,357 | 4/1940 | Widmer et al. | 260—248 X |
| 2,408,694 | 10/1946 | Simons et al. | 260—249.9 X |
| 2,459,710 | 1/1949 | Mackay et al. | 260—249.5 |
| 2,714,057 | 7/1955 | Chenicek | 260—248 X |
| 2,975,177 | 3/1961 | Christmann | 260—248 |
| 3,051,708 | 8/1962 | Merkel et al. | 260—248 |
| 3,111,519 | 11/1963 | Pomot et al. | 260—248 X |
| 3,203,550 | 8/1965 | Schaefer | 260—248 |
| 3,357,979 | 12/1967 | Sobocinski et al. | 260—248 |
| 3,524,853 | 8/1970 | Saito et al. | 260—248 |

JOHN M. FORD, Primary Examiner

U.S. Cl. X.R.

106—291; 260—248 C, 248 AS, 249.6, 249.5, 249.8, 249.9